(12) United States Patent
Ward

(10) Patent No.: US 7,017,297 B1
(45) Date of Patent: Mar. 28, 2006

(54) CONTAINER FOR LIVE FISH

(76) Inventor: Gary A. Ward, 1955 Julian Minchew Rd., Douglas, GA (US) 31533

( * ) Notice: Subject to any disclaimer, the term of this patent is extended or adjusted under 35 U.S.C. 154(b) by 0 days.

(21) Appl. No.: 11/090,132

(22) Filed: Mar. 28, 2005

(51) Int. Cl.
*A01K 97/04* (2006.01)

(52) U.S. Cl. .......................................... 43/55
(58) Field of Classification Search ............. 43/55, 43/56; 206/315.11
See application file for complete search history.

(56) References Cited

U.S. PATENT DOCUMENTS

| | | | |
|---|---|---|---|
| 521,244 A * | 6/1894 | Muncaster | 43/56 |
| 2,153,549 A | 4/1939 | Cooper | |
| 2,179,095 A | 11/1939 | Kelsey | |
| 2,346,744 A | 4/1944 | Glassman | |
| 2,631,402 A | 3/1953 | Lastofka | |
| 2,689,427 A * | 9/1954 | Piker et al. | 43/56 |
| 2,717,469 A * | 9/1955 | Piker et al. | 43/56 |
| 2,765,577 A | 10/1956 | Scruggs | |
| 2,923,087 A | 2/1960 | Cummings | |
| 2,968,887 A * | 1/1961 | Woolworth | 43/56 |
| 3,751,845 A * | 8/1973 | van Leeuwen | 43/56 |
| 3,958,359 A * | 5/1976 | Doughty | 43/55 |
| 4,228,894 A * | 10/1980 | Lyles | 312/235.2 |
| 4,261,131 A | 4/1981 | Poffenberger | |
| 4,353,182 A * | 10/1982 | Junkas et al. | 43/54.1 |
| 4,794,723 A * | 1/1989 | Arnold et al. | 43/55 |
| 4,815,411 A | 3/1989 | Burgess | |
| 4,970,982 A * | 11/1990 | Martin | 114/255 |
| 4,986,021 A | 1/1991 | Thomas | |
| 5,048,222 A | 9/1991 | Correll | |
| 5,187,893 A | 2/1993 | Knight | |
| 5,634,291 A * | 6/1997 | Pham | 43/57 |
| 6,357,169 B1 * | 3/2002 | Gouge | 43/56 |

* cited by examiner

*Primary Examiner*—Kurt Rowan
(74) *Attorney, Agent, or Firm*—Donald R. Schoonover

(57) ABSTRACT

A live fish container has a top with two flexible flaps that co-operate to define a closable opening for the container. A float element is located near the top and a removable seat and a handle are also included. The seat is connected to the container by a hinge mechanism.

1 Claim, 2 Drawing Sheets

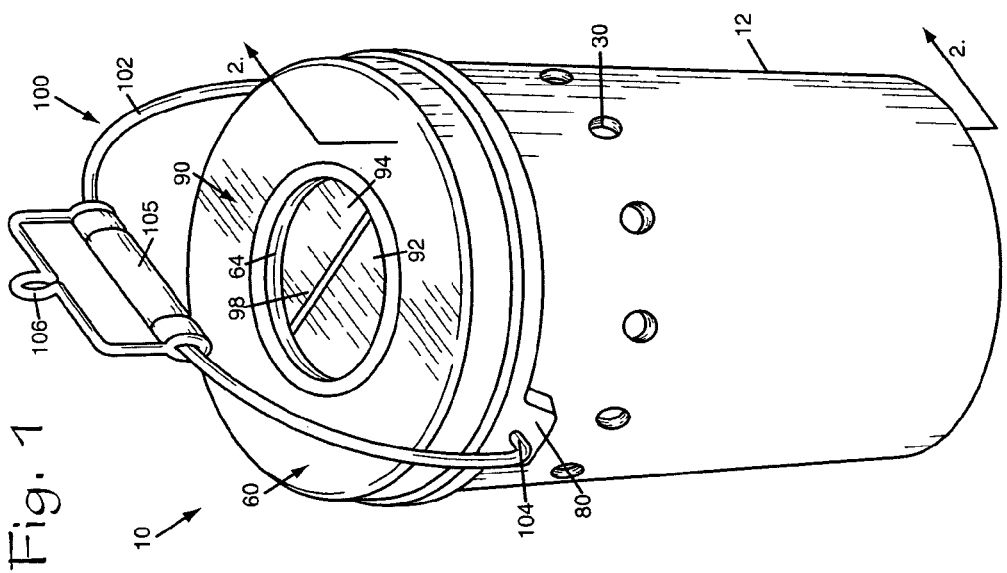

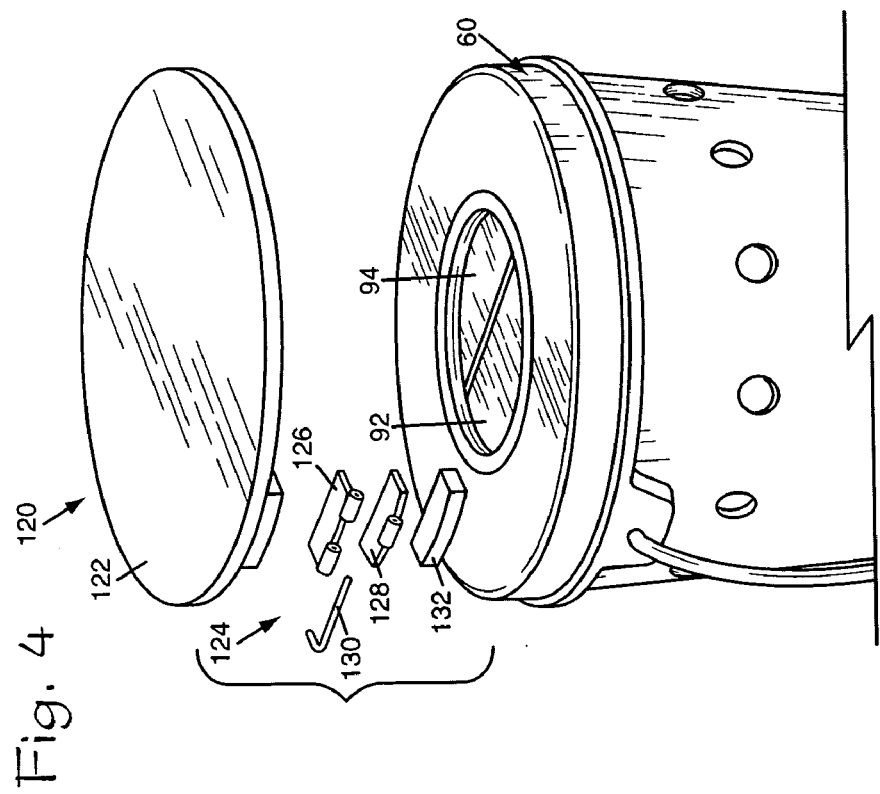
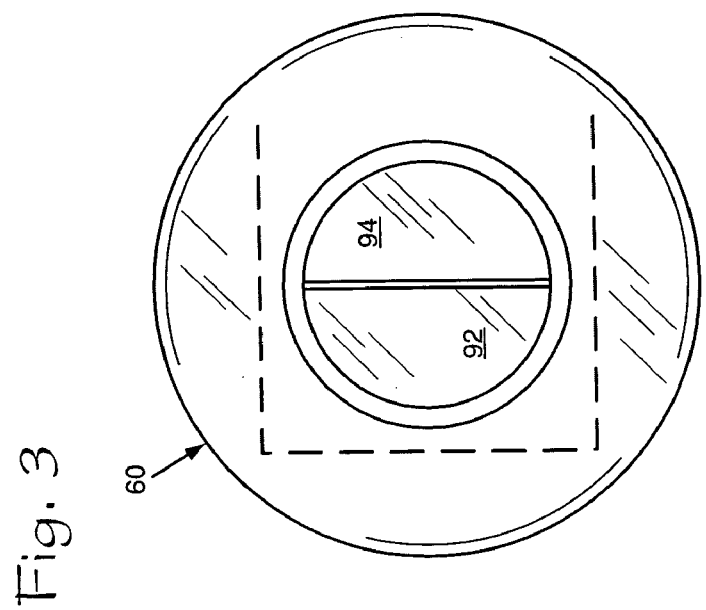

CONTAINER FOR LIVE FISH

BACKGROUND OF THE INVENTION

1. Field of the Invention

The present invention relates to the general art of fishing, and to the particular field of holders and buckets used in fishing.

2. Description of the Related Art

Fishermen desire that fish that are caught be maintained in a live condition as long as possible to reduce spoilage or deterioration of the meat. Likewise, sport fishermen who do not intend to eat their catch desire to maintain the catch alive so that the fish can be returned to the body of water from which they were caught. Heretofore, a common method for keeping such fish alive was to place them on a stringer and to allow the fish to remain submerged in the body of water and on the stringer, with the end of the stringer connected to the fishing boat. However, that method could possibly lead to injury of the fish as a result of the stringer passing through the gills and mouth of the fish. Also, other fish or turtles often discover the stringer and destroy the catch. Moreover, the stringing operation is troublesome to the fisherman and injurious to the fish. Furthermore, if the stringer is not pulled in whenever the boat is moved by power to another location, the fish may be torn off. Another method of keeping caught fish alive is to provide a submersible creel that is submerged in the water, and is in the form of a perforated enclosure. However, such creels can be expensive.

Another technique for maintaining caught fish in a live condition includes a live bait and fish container that is at least partially filled with water to contain fish, and is adapted to float in the water adjacent to a boat and to be tied to the boat so it can be pulled along with it. However, such devices are not well adapted for receiving fish and maintaining the fish uninjured in the container.

Even though the devices that have heretofore been developed can help to maintain the fish in a live state while the fisherman continues to fish, where the fisherman is participating in a fishing contest, in which it is usually required that the fish that are caught be kept alive, weighed, and then returned alive to the body of water from which they are taken, each fish must individually be removed from a stringer or a submerged creel for weighing. Oftentimes the fish are placed in plastic bags partially filled with water in an effort to keep the fish alive. However, in the course of removing the fish from a stringer or retrieving it from a live well, injury is sometimes caused to the fish, and that injury sometimes kills the fish. In tournament fishing, dead fish could result in a penalty being imposed against the fisherman. Further, fish in the plastic bags must be carried to the scales, the water must then be released from the bag, and the fish weighed on the scale. Then, after the weighing has been completed, the fish are again placed in the plastic bags for carrying back to the body of water so that they can be released.

The above-described methods are cumbersome, and also lead to dead or injured fish. Accordingly, there is a need for an improved fish container and carrier that is particularly adapted to keeping the fish alive and injury free.

Still further, many of the devices known to the inventor are used on a boat and are not well adapted for use on land. To be most versatile, such devices should be useable on both land and water.

Therefore, there is a need for an improved fish container and carrier that is particularly adapted to keeping the fish alive and injury free and which can be used on land as well as on a boat.

Still further, to be most useful, a container should be as versatile as possible.

Therefore, there is a need for an improved fish container that can be used as a seat as well.

PRINCIPAL OBJECTS OF THE INVENTION

It is a main object of the present invention to provide an improved fish container and carrier that is particularly adapted to keeping the fish alive and injury free.

It is another object of the present invention to provide an improved fish container and carrier that is particularly adapted to keeping the fish alive and injury free and which can be used on land as well as on a boat.

It is another object of the present invention to provide an improved fish container and carrier that is particularly adapted to keeping the fish alive and injury free and which can be used as a seat for a fisherman.

SUMMARY OF THE INVENTION

These, and other, objects are achieved by a live fish container having a top with two flexible flaps that co-operate to define a closable opening for the container. A float element is located near the top and a removable seat and a handle are also included. The seat is connected to the container by a hinge mechanism.

Using the container embodying the present invention will permit a fisherman to place his catch in a container in a manner that is not likely to injure the fish, but will ensure that the catch remains intact. The container is also versatile and can be used on either a boat or on land and can also double as a seat for the fisherman.

BRIEF DESCRIPTION OF THE DRAWING FIGURES

FIG. 1 is a perspective view of a live fish container embodying the present invention.

FIG. 2 is an elevational view of the live fish container, taken along line 2—2 of FIG. 1.

FIG. 3 is a top plan view showing the cover of the live fish container embodying the present invention.

FIG. 4 shows a seat that can be used in conjunction with the live fish container of the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a live fish container 10 that achieves the above-stated objectives and overcomes the above-discussed shortcomings of the prior art.

Container 10 comprises a tubular container body 12 which includes a tubular side wall 14 having a first end 16 that is a bottom end when container body 12 is in use, a second end 18 that is a top end when container body 12 is in use, and a longitudinal axis 20 which extends between first end 16 and second end 18. Body 12 further includes an inside surface 22 and an outside surface 24. A plurality of vent holes, such as vent hole 30, are defined through the side wall 14 near second end 18. The vent holes 30 can be used for aeration or to permit water to flow through container body 12 if necessary.

A planar end 36 is a bottom end when container body 12 is in use. The inside surface 22 of the side wall 14 and the planar end 36 define an interior volume 40 of container body 12. Fish and water can be stored in interior volume 40.

A flange 44 is mounted on side wall 14 between the vent holes 30 and second end 18 of side wall 14.

A screw thread 46 is located on outside surface 24 of the side wall 14 between flange 44 and second end 18.

An annular float 50 is fixedly mounted on inside surface 22 of the side wall 14 adjacent to second end 18 of the side wall 14. The annular float 50 has a hole 52 defined therethrough.

A container cover unit 60 includes a planar central section 62 having an opening 64 defined therethrough, an inside surface 66, an outside surface 68, and an outer periphery 70. Opening 64 is positioned to be congruent with hole 52 defined through annular float 50.

A flange 74 is unitary with outer periphery 70 of central section 50 and extends out of a plane containing planar central section 62 of container cover unit 60. Flange 74 has a screw thread 76 defined thereon. Screw thread 76 is located and adapted to threadably co-operate with screw thread 46 on the outside surface 24 of side wall 14 when container cover unit 60 is mounted on container body 12.

Two mounting elements, such as mounting element 80 are unitary with flange 74.

A flap unit 90 is fixedly mounted on inside surface 66 of planar central section 62 and is positioned to cover opening 64 defined in the planar central section 62. Flap unit 90 includes first and second flexible planar flap elements 92 and 94. The flap units 92, 94 are identical to each other and each flap unit 92, 94 has a first end 96 that is a proximal end and which is fixedly mounted on planar central section 62 adjacent to opening 64, and a second end 98 that is a distal end and which is located adjacent to opening 64 and which spans opening 64 along a diametric direction of that opening 64. The second ends 98 of the flap elements 92, 94 are unattached to the central section 62 and are free to move with respect to the central section 62 between an opening covering position shown in FIG. 1 and an opening uncovering position.

The second end 98 of first flap element 92 is in abutting contact with the second end 98 of second flap element 94 and closes opening 64 of the central section 62 when the flap elements 92, 94 are in the opening covering position. The flap elements 92, 94 are moved into an opening uncovering position when a fish is pushed through the opening and because they are resilient, will flex outwardly to permit the fish to move into the container but will flex back into the opening covering position once the fish has been moved into the container 10. Only one hand is required to move the fish into the container 10.

A handle unit 100 is pivotally mounted on container cover unit 60 and includes a U-shaped handle element 102 having pivot portions, such as pivot portion 104, pivotally connected to each of the mounting elements 80 of container cover unit 60 and a handle element 105 on U-shaped handle element 102. A cable tie eye 106 is mounted on handle element 102.

A seat unit 120 is removably mounted on container cover unit 60 in use and includes a seat section 122. A hinge unit 124 includes a first hinge unit element 126, which is mounted on the seat section 122, and a second hinge unit element 128, which is mounted on container cover unit 60. A connecting pin 130 hingeably connects first hinge unit element 126 to second hinge unit element 128 when the seat unit 120 is connected to the container cover 60 by the hinge unit 124. A spacer element 132 can also be interposed between the two hinge unit elements 126, 128 and the container cover unit 60.

The seat unit 120 can be quickly attached to the container body 12 whereby container 10 can also be used as a seat if desired.

Use of container 10 can be understood from the teaching of the foregoing disclosure and thus will only briefly be discussed. Container 10 can be used on land or can be placed in the water as desired. Water and/or air can flow through the container 10 via vent holes 30 and the container 10 can be attached to a support via eye 106 and carried using handle unit 100. As a fish is caught, it is pushed through holes 64 and 52 through flaps 92 and 94 which flex to permit the fish to be forced into the container 10. Once the fish clears the flaps 92, 94, the flaps return to the opening covering position shown in the Figures. The float 50 can be used to keep the container 10 in the proper position with respect to the surface of the water whereby proper water and air flow is maintained through the container 10 and the container is easily accessed. The hinge unit 124 permits the seat section 122 to be lifted so a fish can be placed in the container 10.

It is to be understood that while certain forms of the present invention have been illustrated and described herein, it is not to be limited to the specific forms or arrangements of parts as described and shown.

The invention claimed is:
1. A live fish container comprising:
 a) a tubular container body which includes
  (1) a tubular side wall having a first end that is a bottom end when said container body is in use, a second end that is a top end when said container body is in use, a longitudinal axis which extends between the first end and the second end, an inside surface, an outside surface, and a plurality of vent holes defined through the side wall near the second end,
  (2) a planar end which is a bottom end when said container body is in use,
  (3) the inside surface of the side wall and the planar end defining an interior volume for said container body,
  (4) a flange mounted on the side wall between the vent holes and the second end of the side wall, and
  (5) a screw thread on the outside surface of the side wall between the flange and the second end;
 b) an annular float fixedly mounted on the inside surface of the side wall adjacent to the second end of the side wall, the annular float having a hole defined therethrough;
 c) a container cover unit which includes
  (1) a planar central section having an opening defined therethrough, an inside surface, an outside surface, and an outer periphery, the opening defined in the planar central section being positioned to be congruent with the hole defined through said annular float,
  (2) a flange which is unitary with the outer periphery of the central section of said container cover unit and which extends out of a plane containing the planar central section of said container cover unit, the flange having a screw thread defined thereon, the screw thread on the flange being located and adapted to threadably co-operate with the screw thread on the outside surface of the side wall of said container body when said container cover unit is mounted on said container body, and
  (3) two mounting elements, each of which is unitary with the flange of said container cover unit;
d) a flap unit fixedly mounted on the inside surface of the planar central section and positioned to cover the opening defined in the planar central section, said flap unit including first and second flexible planar flap elements, each flap unit having
  (1) a first end that is a proximal end, the first end being fixedly mounted on the planar central section adjacent to the opening defined in the central section,
  (2) a second end that is a distal end, the second end being located adjacent to the opening defined in the central section, the second end spanning the opening defined in the central section in a diametric direction of the opening and being unattached to the central section and free to move with respect to the central section between an opening covering position and an opening uncovering position,
  (3) the second end of the flap element being in abutting contact with the second end of the second flap element and closing the opening of the central section when the flap elements are in the opening covering position;
e) a handle unit pivotally mounted on said container cover unit and including a U-shaped handle element having pivot portions pivotally connected to each of the mounting elements of said container cover unit and a handle element on the U-shaped handle element and which includes a cable tie eye thereon; and
f) a seat unit which is removably mounted on said container cover unit in use and which includes
  (1) a seat section, and
  (2) a hinge unit which includes
    (A) a first hinge unit element mounted on the seat section and which is connected to said container cover unit,
    (B) a second hinge unit element mounted on said container cover unit, and
    (C) a connecting pin which hingeably connects the first hinge unit element to the second hinge unit element when said seat unit is connected to said container cover by said hinge unit.

\* \* \* \* \*